US009200768B2

(12) United States Patent
Ogura et al.

(10) Patent No.: US 9,200,768 B2
(45) Date of Patent: Dec. 1, 2015

(54) LIGHT SOURCE UNIT AND PROJECTOR

(71) Applicant: CASIO COMPUTER CO., LTD., Shibuya-ku, Tokyo (JP)

(72) Inventors: Naotsugu Ogura, Hamura (JP); Hideki Nakamura, Hamura (JP); Hideyuki Kurosaki, Tachikawa (JP); Tomoyuki Nagao, Fussa (JP); Makoto Sato, Tachikawa (JP); Hiroshi Ogino, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 119 days.

(21) Appl. No.: 13/801,995

(22) Filed: Mar. 13, 2013

(65) Prior Publication Data

US 2013/0242267 A1 Sep. 19, 2013

(30) Foreign Application Priority Data

Mar. 14, 2012 (JP) .................................. 2012-056591

(51) Int. Cl.
*G03B 21/26* (2006.01)
*F21V 9/00* (2015.01)
(Continued)

(52) U.S. Cl.
CPC . *F21S 2/00* (2013.01); *G03B 21/14* (2013.01); *G03B 21/204* (2013.01); *G03B 21/2013* (2013.01); *H04N 9/315* (2013.01); *H04N 9/3111* (2013.01)

(58) Field of Classification Search
CPC .................................................... G03B 21/204
USPC .......................... 353/84, 94, 31; 362/510, 293
See application file for complete search history.

(56) References Cited

U.S. PATENT DOCUMENTS 8,894,241 B2 11/2014 Kitano
2005/0135095 A1 6/2005 Geissler
2008/0030984 A1* 2/2008 Harbers et al. ................ 362/231
(Continued)

FOREIGN PATENT DOCUMENTS

CN 1637585 A 7/2005
JP 2004-341105 A 12/2004
(Continued)

OTHER PUBLICATIONS

Korean Office Action dated May 22, 2014 in counterpart Korean Application No. 10-2013-0026978.
(Continued)

*Primary Examiner* — William C Dowling
*Assistant Examiner* — Ryan Howard
(74) *Attorney, Agent, or Firm* — Holtz, Holtz, Goodman & Chick PC

(57) ABSTRACT

A light source unit includes an excitation light source, a plurality of light sources at least one of which emits a light ray in a wavelength band different from that of the excitation light source, a plurality of collimator lenses which make light rays from the light sources into parallel ones, a luminous light emitting device which receives the light ray from the excitation light source to emit a luminous light ray, a microlens array which diffuses the light rays from the light sources to a predetermined range and distributes the luminance thereof uniformly within the predetermined range and a collective lens which collects the light rays from the light sources which are emitted from the microlens array, and the light sources are disposed so that the light rays from the plurality of light sources intersect the light ray from the excitation light source at right angles.

9 Claims, 3 Drawing Sheets

(51) Int. Cl.
*F21S 2/00* (2006.01)
*G03B 21/20* (2006.01)
*G03B 21/14* (2006.01)
*H04N 9/31* (2006.01)

(56) References Cited

U.S. PATENT DOCUMENTS

| | | | |
|---|---|---|---|
| 2010/0238412 A1* | 9/2010 | Kurosaki | 353/31 |
| 2011/0007240 A1* | 1/2011 | Qu et al. | 349/62 |
| 2011/0234998 A1 | 9/2011 | Kurosaki | |
| 2011/0249242 A1 | 10/2011 | Saitou et al. | |
| 2011/0261326 A1* | 10/2011 | Wang et al. | 353/31 |
| 2012/0105811 A1* | 5/2012 | Huang | 353/31 |
| 2012/0327374 A1* | 12/2012 | Kitano et al. | 353/31 |

FOREIGN PATENT DOCUMENTS

| | | |
|---|---|---|
| JP | 2011-053323 A | 3/2011 |
| JP | 2012156182 A | 8/2012 |
| JP | 2013092752 A | 5/2013 |
| KR | 1020110107284 A | 9/2011 |
| WO | 2011092842 A1 | 8/2011 |

OTHER PUBLICATIONS

Chinese Office Action dated Oct. 8, 2014, issued in counterpart Chinese Application No. 201310081128.0.

Japanese Office Action (and English translation thereof) dated Jul. 9, 2015, issued in counterpart Japanese Application No. 2012-056591.

* cited by examiner

LIGHT SOURCE UNIT AND PROJECTOR

CROSS-REFERENCE TO RELATED APPLICATION

This application is based upon and claims the benefit of priority under 35 USC 119 of Japanese Patent Application No. 2012-56591 filed on Mar. 14, 2012, the entire contents of which, including the specification, claims, drawings and abstract, are incorporated herein by reference.

BACKGROUND OF THE INVENTION

1. Field of the Invention

The present invention relates to a light source unit and a projector.

2. Description of the Related Art

Currently, data projectors are used on many occasions as image projection units which project the screen of a personal computer and video images, as well as images based on image data stored in a memory card or the like to a screen. Conventionally, the mainstream of these projectors has been those which use as a light source a high-intensity discharge lamp. In recent years, however, there have been made many developments or proposals of projectors which use as a light source a light emitting diode (LED), a laser light emitting element, an organic EL or a luminescent material.

Additionally, there have been made developments on light sources and projectors which increase the light utilization efficiency by taking into consideration the chip-shapes and light distribution characteristics depending upon colors of red, green and blue LED chips. For example, Japanese Unexamined Patent Publication No. 2011-53323 filed by the applicant of this patent application discloses a light source unit including an excitation light source which emits light in the blue wavelength band by using a laser diode, a luminescent wheel (a rotary plate) that has a layer of a luminescent material which absorbs light emitted from the excitation light source to transform it into visible green light and a diffusive transmission layer which diffusively transmits light emitted from the excitation light source and which is driven to rotate by a motor, and a light emitting diode which emits red light, and a projector which includes this light source unit.

Additionally, Japanese Unexamined Patent Publication No. 2004-341105 proposes a light source unit in which red, green and blue luminescent material layers are laid in an end-to-end fashion on a front surface of a light emitting plate made up of a light transmissive disk while a dichroic filter which transmits ultraviolet light and reflects visible light is disposed on a rear surface of the light emitting plate, whereby lights in the red, green and blue wavelength bands are produced by shining ultraviolet light onto the luminescent material layers from a rear surface side of the light emitting plate.

In the light source unit described above, however, since the directions in which the lights in the red, green and blue wavelength bands are emitted from their emitting point are different from each other, an optical layout necessary to turn optical axes of the red, green and blue lights into the same direction for illumination of the display element becomes complex. This complex optical layout increases the numbers of lenses and mirrors and interrupts the attempt to reduce the production costs and size of the projector.

BRIEF SUMMARY OF THE INVENTION

The invention has been made in view of the problems inherent in the related art, and an object thereof is to provide a light source unit that is small in size and which has a high luminous efficiency and a projector which includes this light source unit.

According to an aspect of the invention, there is provided a light source unit including an excitation light source, a luminous light emitting plate which faces oppositely the excitation light source, a light source which emits at least two kinds of light rays in different wavelength bands which are different from that of luminous light from the luminous light emitting plate which is emitted by light emitted from the excitation light source, and a dichroic mirror which is disposed in a position where an optical axis of a pencil of light emitted from the excitation light source and optical axes of pencils of light emitted from the light source intersect each other at right angles, wherein the luminous light reflected by the dichroic mirror and the light from the light source transmitted through the dichroic mirror are emitted in the same direction.

According to another aspect of the invention, there is provided a projector including the light source unit described above, a display element which produces projection light, an optical system which guides light emitted from the light source unit to the display element, a projection optical system which guides the projection light produced by the display element, and a projector control unit which controls the display element and the light source unit.

According to the invention, it is possible to provide the light source unit that is small in size and which has a high luminous efficiency and the projector including this light source unit.

BRIEF DESCRIPTION OF THE DRAWINGS

Although the invention will be understood sufficiently from the following detailed description and accompanying drawings, they are intended to mainly illustrate the invention and hence are not intended to limit the spirit and scope of the invention in any way.

In the accompanying drawings.

DETAILED DESCRIPTION OF THE INVENTION

Figure 1:
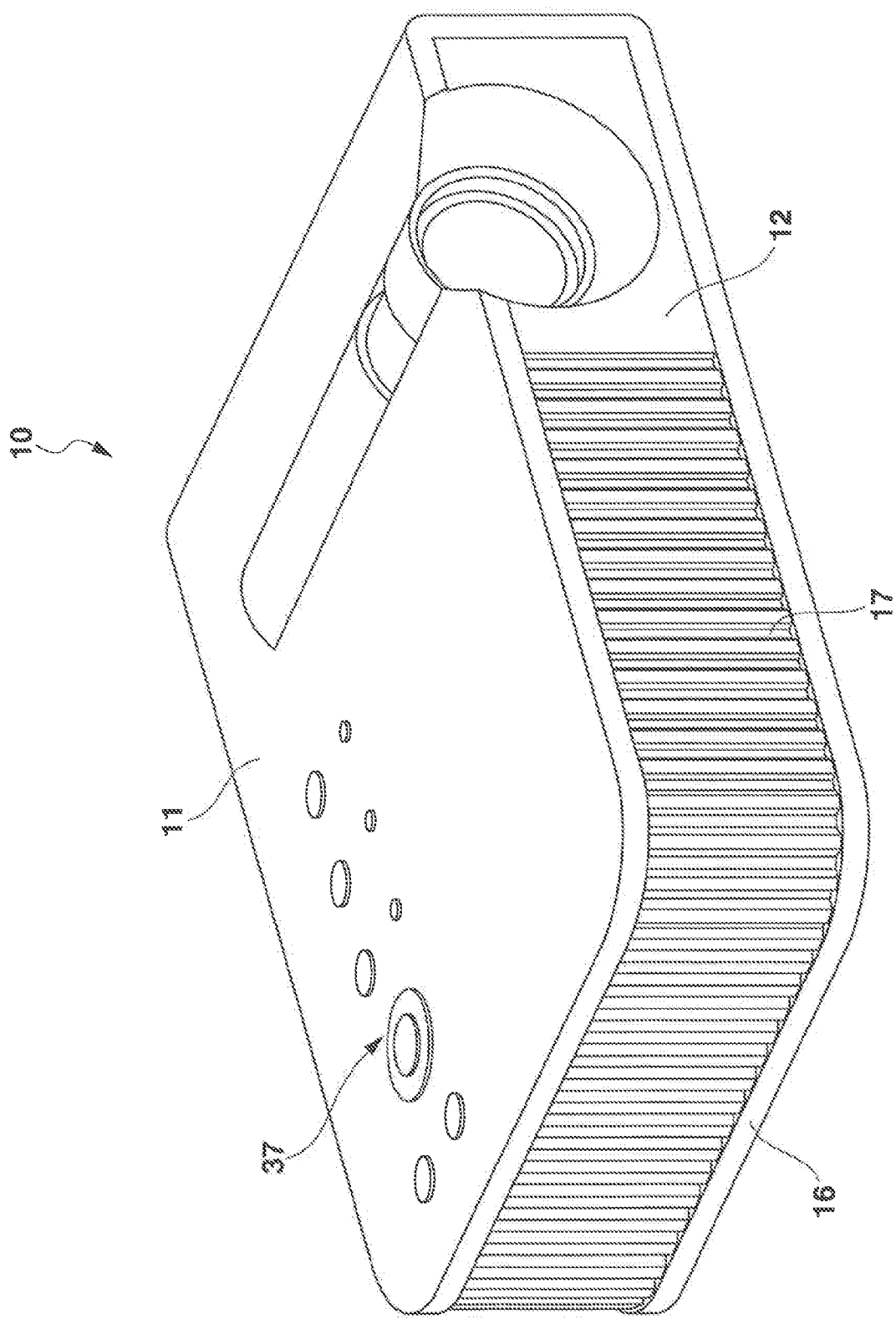
FIG. 1 is a perspective view showing an external appearance of a projector according to an embodiment of the invention.

Hereinafter, an embodiment of the invention will be described in detail by reference to the accompanying drawings. FIG. 1 is a perspective view showing an external appearance of a projector 10. In this embodiment, when a description is made on left and right with respect to the projector 10, they denote, respectively, left and right of the projector 10 with respect to a projecting direction, and when a description is made on front and rear with respect to the projector 10, they denote, respectively, front and rear of the projector 10 with respect to the direction of a screen and a traveling direction of a pencil of light.

As is shown in FIG. 1, the projector 10 has a substantially rectangular parallelepiped shape and has a projection unit which is laid to a side of a front panel 12 which is referred to as a front side panel of a projector housing, as well as a plurality of inside air outlet holes 17 which are provided in in the front panel 12. Further, although not shown, the projector 10 includes an Ir reception unit for receiving a control signal from a remote controller.

In addition, a keys/indicators unit 37 is provided on an upper case 11 of the housing. Disposed on this keys/indicators unit 37 are keys and indicators which include a power supply switch key, a power indicator which informs whether a power supply for the projector 10 is on or off, a projection switch key which switches on or off the projection by the projector 10, an overheat indicator which informs of an overheat condition when a light source unit, a display element, a control circuit or the like overheats. In addition, the upper case 11 covers all over an upper surface to part of a left side surface of the projector housing, and when something fails in the projector 10, the upper case 11 can be removed from a lower case 16.

Further, provided on a back side or a back panel of the housing are an input/output connector unit where USB terminals, an image signal input D-SUB terminal into which analog RGB image signals are inputted, an S terminal, an RCA terminal, an audio output terminal and the like and various types of terminals including a power supply adaptor plug and the like. In addition, a plurality of outside air inlet holes are formed in the back panel.

Figure 2:
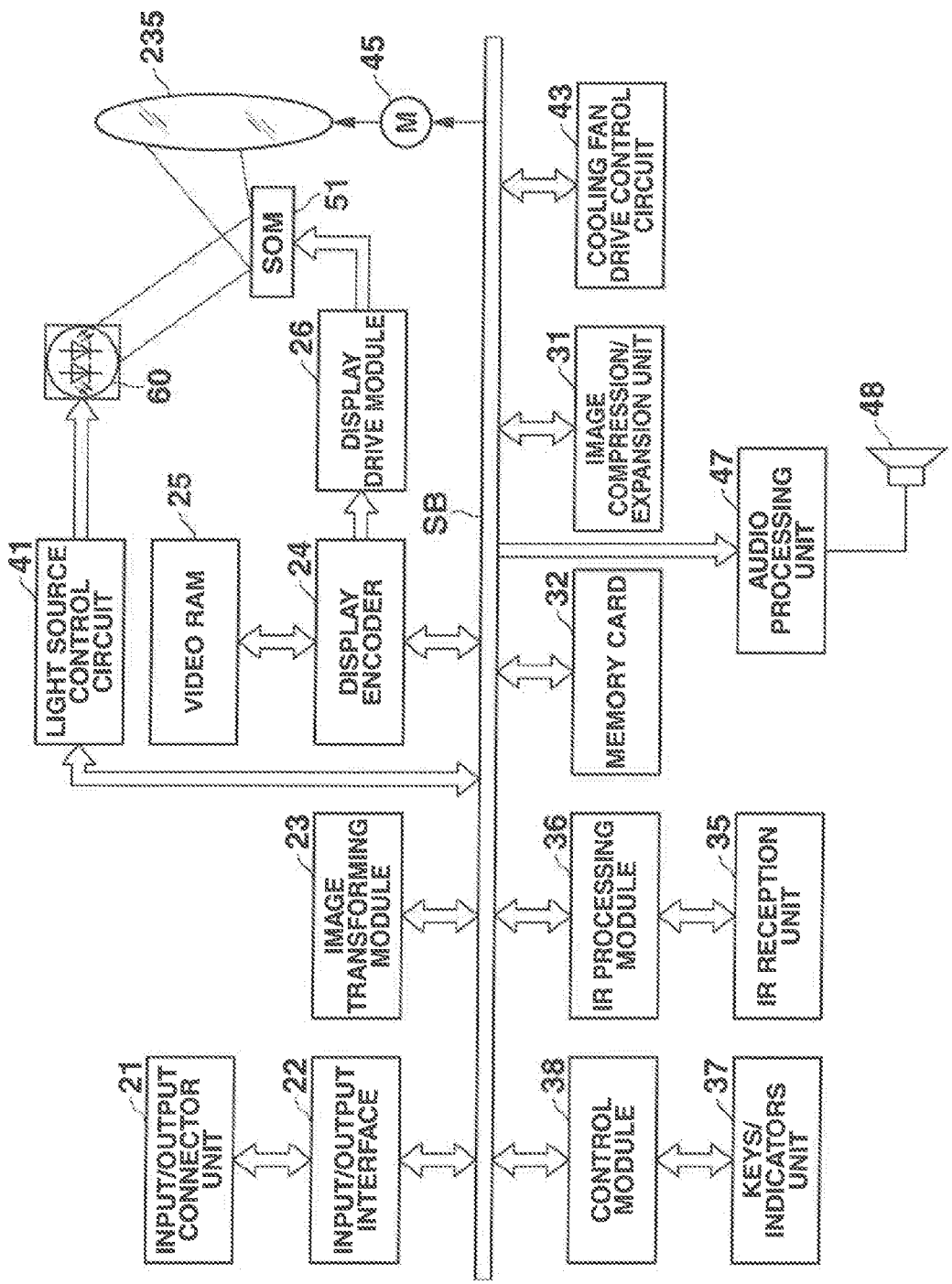
FIG. 2 is a functional block diagram of the projector according to the embodiment of the invention.

Next, a projector control unit of the projector 10 will be described by use of a functional block diagram in FIG. 2. The projector control unit includes a control module 38, an input/output interface 22, an image transforming module 23, a display encoder 24, a display drive module 26 and the like.

The control module 38 governs the control of respective operations of circuitries within the projector 10 and is made up of a CPU, a ROM which stores in a fixed fashion operation programs of various types of settings and a RAM which is used as a working memory.

The projector control unit controls so that image signals of various standards that are inputted from an input/output connector unit 21 are sent via the input/output interface 22 and a system bus (SB) to the image transforming module 23 where the image signals are transformed so as to be unified into an image signal of a predetermined format which is suitable for display. Thereafter, the image signals so transformed are outputted to the display encoder 24.

Then, the display encoder 24 deploys the image signals inputted thereinto on a video RAM 25 for storage therein and then generates a video signal from the contents stored in the video RAM 25, outputting the video signal so generated to the display drive module 26.

The display drive module 26 functions a display element control module and drives a display element 51 which is a spatial optical modulator (SOM) at an appropriate frame rate in response to the image signal outputted from the display encoder 24.

In this projector 10, a pencil of light which is emitted from a light source unit 60 is guided to the display element 50 by an optical system to thereby form an optical image based on reflected light reflected at the display element 51. The image so formed is then projected on to a screen, not shown, for display via a projection optical system. A movable lens group 235 of the projection optical system is driven by a lens motor 45 for zooming or focusing.

In addition, an image compression/expansion unit 31 performs a recording operation in which a luminance signal and a color difference signal of an image signal are data compressed through ADCT and Huffman coding and the compressed data is sequentially written in a memory card 32 which is configured as a detachable recording medium.

Further, when in a reproducing mode, the image compression/expansion unit 31 reads out image data recorded in the memory card 32 and expands individual image data which make up a series of dynamic images frame by frame. Then, the image data is outputted to the display encoder 24 via the image transforming module 23 so as to enable the display of dynamic images based on the image data stored in the memory card 32.

Operation signals generated at the keys/indicators unit 37 which is made up of the main keys, indicators and the like provided on the upper case 11 of the housing are sent out directly to the control module 38, while key operation signals from the remote controller are received by an Ir reception unit 35, and a code signal demodulated at an Ir processing module 36 is outputted to the control module 38.

In addition, an audio processing unit 47 is connected to the control module 38 via the system bus (SB). This audio processing unit 47 includes a sound source circuit such as a PCM sound source. When in a projection mode and a reproducing mode, the audio processing unit 47 converts audio data into analog signals and drives a loud speaker 48 to output loudly sound or voice based on the audio data.

Additionally, the control module 38 controls a light source control circuit 41 as a light source control unit, and this light source control circuit 41 controls individually a red light source device, a green light source device and a blue light source device for emission of light therefrom so that light in a predetermined wavelength band required when in generation of a image is emitted from the light source unit 60.

Further, the control module 38 causes a cooling fan drive control circuit 43 to execute a temperature detection by using a plurality of temperature sensors provided in the light source unit 60 so as to control the rotation speed of a cooling fan based on the results of the temperature detection executed. Additionally, the control module 38 also controls the cooling fan drive control circuit 43 so that the cooling fan continues to rotate, even after the power supply to a projector main body is switched off, by using a timer or the power supply to the projector main body is switched off depending upon the results of the temperature detection executed.

Figure 3:
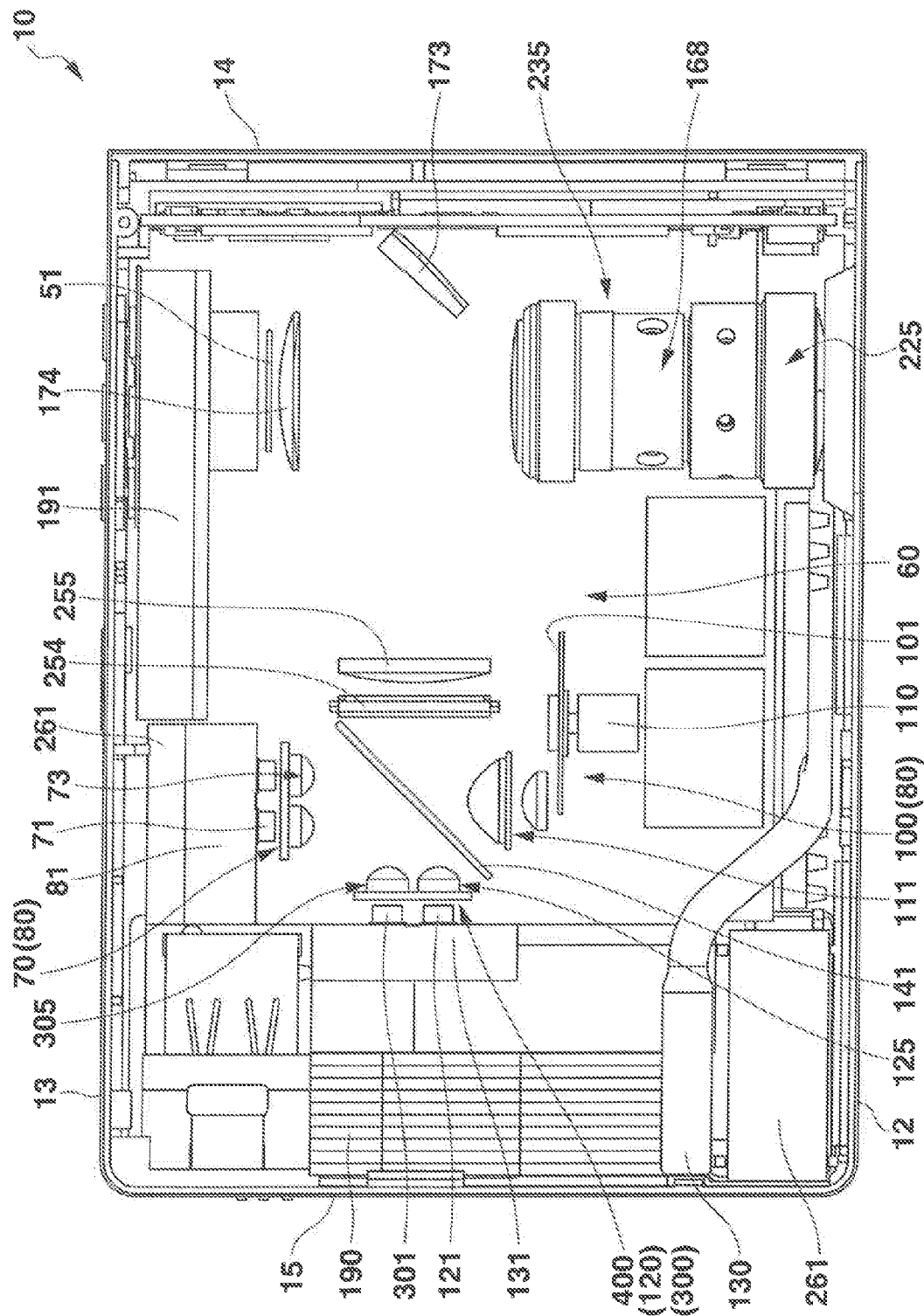
FIG. 3 is a schematic diagram showing exemplarily an internal construction of the projector according to the embodiment of the invention.

Next, an internal construction of the projector 10 will be described. FIG. 3 is a schematic diagram showing exemplarily the internal construction of the projector 10.

As shown in FIG. 3, the projector 10 includes the light source unit 60 which is provided in a central portion and a lens barrel 225 that incorporates therein the projection optical system and which is disposed to the left of the light source unit 60. Additionally, the projector 10 includes the display element 51, which is a DMD or the like, between the lens barrel 225 and the back panel 13. Further, the projector 10 includes a main control circuit board below the light source unit 60.

In addition, the projector 10 includes a heat sink 191 which cools the display element 51 between the display element 51 and the back panel 13. Additionally, the projector 10 includes heat sinks 131, 190 for cooling a red light source 121 and a blue light source 301 between the light source unit 60 and a right side panel 15.

The projector 10 includes a green light source device 80, a two-color light source device 400 and an optical system. The green light source device 80 is made up of an excitation light shining device 70 which is disposed in a substantially transversely central portion of the projector housing and a luminous light emitting device 100 which is disposed on an optical axis of a pencil of light which is emitted from the excitation light shining device 70 and near the front panel 12. The two-color light source device 400 is made up of a blue light source device 300 and a red light source device 120 which are disposed side by side between the excitation light shining device 70 and the luminous light emitting device 100. The optical system turns optical paths of light emitted from the luminous light emitting device 100, light emitted from the red light source device 120 and light emitted from the blue light source device 300 so that optical axes of the green, red and blue light rays emitted from the light source devices are directed into the same optical axis so as to be shone on to a predetermined plane of the display element 51.

The excitation light shining device 70 which makes up the green light source device 80 includes excitation light sources 71 made up of semiconductor light emitting elements which are disposed so that optical axes thereof become normal to the back panel 13 and a heat sink 81 which is disposed between the excitation light sources 71 and the back panel 13.

Specifically, the excitation light sources 71 are two blue laser diodes, which are semiconductor light emitting elements, and the two blue laser diodes are disposed side by side. Collimator lenses 73, which are collective lenses which transform light rays emitted individually from the blue laser diodes into parallel beams, are disposed individually on optical axes of the blue laser diodes.

A cooling fan 261, which is a blower fan for forcing outside air towards the heat sink 81 as a cooling medium, is disposed between the heat sink 81 and the back panel 13. The excitation light sources 71 are cooled by the cooling fan 261 and the heat sink 81.

The luminous light emitting device 100 which makes up the green light source device 80 includes a luminescent wheel 101, a wheel motor 110 which drives to rotate the luminescent wheel 101, and a collective lens group 111. The luminescent wheel 101 is disposed so as to be parallel to the front panel 12, that is, so as to be intersected at right angles to optical axes of light rays emitted from the excitation light shining device 70. The collective lens group 111 collects a pencil of light emitted from the luminescent wheel 101 in the direction of the back panel 13.

The luminescent wheel 101 is a disk-shaped metallic base. An annular luminous light emitting area is formed into a depressed portion on the disk-shaped metallic base, and this annular luminous light emitting area receives light rays emitted from the excitation light sources 71 as excitation light and emits luminous light in the green wavelength band. A luminescent material which emits luminous light when receiving excitation light is coated on the luminous light emitting area, whereby the luminescent wheel 101 functions as a luminous light emitting plate. In addition, a surface of the luminescent wheel 101 that contains the luminous light emitting area and which faces the excitation light sources 71 is mirror finished through silver deposition into a reflection surface which reflects light, and a layer of a green luminescent material is laid on this reflection surface.

Light shone onto the green luminescent material layer from the excitation light shining device 70 excites the green luminescent material in the green luminescent material layer to produce a pencil of luminous light. Luminous light rays emanating in every direction from the green luminescent material are directed directly towards the excitation light sources 71 or reflected on the reflection surface of the luminescent wheel 101 to be eventually directed towards the excitation light sources 71.

Excitation light shone onto the metallic base without being absorbed by the luminescent material in the luminescent material layer is reflected on the reflection surface to enter again the luminescent material layer to eventually excite the luminescent material. Thus, by forming the surface of the depressed portion on the luminescent wheel 101 into the reflection surface, it is possible to increase the utilization efficiency of excitation light emitted from the excitation light sources 71 which are green light sources, whereby it is possible to illuminate the light source unit 60 more brightly.

In the excitation light which is reflected towards the luminescent material layer on the reflection surface of the luminescent wheel 101, the excitation light emitted towards the excitation light sources 71 without being absorbed by the luminescent material is transmitted through a dichroic mirror 141, while luminescent light is reflected by the dichroic mirror 141. Because of this, there are no fears that excitation light is emitted to the outside of the projector 10. Then, a heat sink 130 is disposed between the wheel motor 110 and the front panel 12, and the luminescent wheel 101 is cooled by this heat sink 130.

The two-color light source device 400, which is made up of the blue light source device 300 and the red light source device 120 which are disposed side by side, is provided so that the optical axes of red and blue right rays emitted therefrom intersect the optical axis of light rays emitted from the excitation light sources 71 at right angles. Then, in the two-color light source device 400, the blue light source device 300 includes the blue light source 301, a collective lens 305 which collects light emitted from the blue light source 301 within a predetermined range for emission therefrom. In the same light source device, the red light source device 120 includes the red light source 121, a collective lens 125 which collects light emitted from the red light source 121 within a predetermined range for emission therefrom. Additionally, the blue light source device 300 and the red light source device 120 are disposed so that their optical axes intersect light emitted from the excitation shining device 70 and luminous light in the green wavelength band emitted from the luminescent wheel 101 at right angles.

The blue light source 301 is a blue laser emitting device as a semiconductor light emitting element which emits light in the blue wavelength band. In addition, the red light source 121 is a red laser emitting device as a semiconductor light emitting element which emits light in the red wavelength band. Further, the blue light source device 300 and the red light source device 120 include the heat sinks 131, 190 which are disposed near the blue light source 301 and the red light source 121.

A cooling fan 261 is disposed between the heat sinks 131, 190 and the front panel 12. This cooling fan 261 functions as a suction fan which sucks the cooling medium forced into the projector housing by the blower fan and warmed up by the heat sinks 131, 190 and discharges it to the outside of the projector 10. The red light source 121 and the blue light source 301 are cooled by this cooling fan 261.

The optical system of the light source unit 60 is made up of the collective lenses which collect the pencils of light rays in the red, green and blue wavelength bands and the dichroic mirror which turns the optical axes of the pencils of light rays in the red, green and blue wavelength bands into the same optical axis.

Specifically, the dichroic mirror 141 is disposed in a position where the optical axes of light rays in the blue wavelength band emitted from the excitation light shining device 70 and the optical axis of light in the green wavelength band emitted from the luminescent wheel 101 intersect the optical axes of light in the red wavelength band and light in the blue wavelength band which are emitted from the two-color light source device 400. This dichroic mirror 141 transmits light in the blue wavelength band and light in the red wavelength band and reflects light in the green wavelength band and turns the optical axis of this green light by 90 degrees in the direction of a left side panel 14.

Additionally, a microlens array 254 is disposed to the left of the dichroic mirror 141, and this microlens array 254 distributes the luminance of the light rays emitted from the individual light sources uniformly within a predetermined range while diffusing them individually within a predetermined range.

As described above, the microlens array 254 uniformly distributes within a predetermined range the luminance of light rays that are emitted from the light sources and which are incident thereon. Conventionally, for this purpose, for example, a space-consuming light tunnel or light smoothing and guiding rod has been adopted.

Then, in this embodiment, as the microlens array 254, a microlens array is adopted in which many fine microlenses are arranged. Specifically, in the microlens array 254, planoconvex aspherical microlenses or planoconcave microlenses are arranged into a grid-like form or a hexagonal grid-like form at intervals of 0.2 to 0.4 mm. Additionally, a collective lens 255 is disposed near the microlens array 24, and this collective lens 255 collects light that is diffused and uniformly distributed in luminance and which is transmitted through the microlens array 254 to an effective size of the display element 51.

The collective lenses 125, 305 of the two-color light source device 400 are each formed into one collective lens by combining a plurality of lenses. The dichroic mirror 141 is disposed in the position where the optical axis of the excitation light shining device 70 and the optical axis of the two-color light source device 400 intersect each other.

Consequently, the light in the red wavelength band, the light in the green wavelength band and the light in the blue wavelength band can be superposed on the same optical path by the single dichroic mirror 141.

Further, in guiding light source light emitted from the light source unit 60 to the display element 51, the pencil of light the intensity of which is distributed uniformly by the microlens array 254 can be emitted to an optical axis changing mirror 173.

Additionally, a condenser lens 174 is provided which shines the light source light which is reflected by the optical axis changing mirror 173 onto the display element 51 effectively. A heat sink 191 or the like is disposed between the display element 51 and the back panel 13 for cooling the display element 51.

Further, a lens group of the projection optical system 168 is provided which projects "on" light reflected by the display element 51 on to a screen. The projection optical system 168 is a variable-focus lens in which a fixed lens group which is incorporated in the lens barrel 225 and a movable lens group 235 which is incorporated in a movable lens barrel are provided, whereby the movable lens group is moved by the lens motor for zooming or focusing.

In this embodiment, while the blue light source 301 is described as being the blue laser device which is the semiconductor light emitting element which emits light in the blue wavelength band and the red light source 121 is described as being the red laser device which is the semiconductor light emitting element which emits light in the red wavelength band, the invention is not limited thereto, and hence, there should be no problem even in the event that the blue right source 301 and the red light source 121 are high-intensity light emitting diodes.

In these red light source and blue light source, pencils of light having different wavelength bands, that is, a pencil of light in the red wavelength band and a pencil of light in the blue wavelength band are both emitted in the same direction while traveling close and parallel to each other by adjusting the distance between the collective lenses and the light emitting elements so that the pencils of light emanating from the two-color light source 400 can illuminate a predetermined range on the microlens array 254.

Then, when passing through the microlens array 254, the optical axes of the pencils of light in the red, green and blue wavelength bands are aligned and their luminance is uniformly distributed by the microlens array 254. Then, the pencils of light are collected by the collective lens 255. As this occurs, the pencils of light are collected to a size equal to the effective size of the display element 51 by the collective lens 255 and are then shone on to the display element 51.

Thus, as has been described heretofore, according to the embodiment, the light in the red wavelength band, the light in the green wavelength band and the light in the blue wavelength band are superposed on the same optical path by the single dichroic mirror 141. Therefore, the numbers of constituent optical components can be reduced, and in association with the reduction in the numbers of constituent optical components, the attenuation of light can be reduced. Thus, it is possible to provide the light source unit 60 that is small in size and which can realize a high-intensity projection and the projector 10 which includes this light source unit.

In addition, according to the embodiment of the invention, the light source which emits light in the red wavelength band and the light source which emits light in the blue wavelength band are provided side by side so as to be integrated into the single light source device, whereby both the red light and the blue light can be emitted in the same direction with the optical axes thereof extending close and parallel to each other.

Further, according to the embodiment of the invention, the luminous light emitting device 100 includes the luminescent plate which receives pencils of light emitted from the excitation light sources 71 to emit green luminous light, and therefore, it is possible to produce high-intensity green light.

In addition, according to the embodiment of the invention, by adopting the microlens array 254, the luminance of the pencils of light passing through the microlens array 254 can be distributed uniformly by the single small optical member. Further, by adopting the collective lens 255, the pencils of light passing through the collective lens 255 can be collected to the size equal to the effective size of the display element 51 by the single small optical member.

Additionally, according to the embodiment of the invention, by providing the single dichroic mirror which transmits light in the red wavelength band and light in the blue wavelength band and reflects light in the green wavelength band in the position where pencils of light emitted from the plurality of light sources and pencils of light emitted from the excitation light sources 71 intersect each other at right angles, it is possible to realize the compact optical system which allows the pencils of light of the three colors to coincide with one another so that their optical axes are aligned.

Further, according to the embodiment of the invention, in the two-color light source device, the constituent light sources which emit light rays in the different wavelength bands are each made up of a plurality of light source elements, and therefore, a predetermined luminance can be ensured in each of the light rays emitted from the light sources.

In addition, according to the embodiment of the invention, the excitation light sources 71 are the laser emitting devices, and therefore, it is possible to produce high-intensity green light.

Additionally, according to the embodiment of the invention, the two-color light source device is the laser emitting device, and therefore, it is possible to produce high-intensity red and blue light rays.

Further, according to the embodiment of the invention, in the event that light emitting diodes are used for the light sources of the two-color light source device, it is possible to reduce the parts-related costs.

While the embodiment and the modified examples have been described heretofore, they are illustrated as the examples of the invention and hence are not intended to limit the spirit and scope of the invention. The novel embodiment including the modified examples can be carried out in other various forms, and various omissions, replacements and modifications can be made thereto without departing from the spirit and scope of the invention. Those resultant embodiments and modifications are to be included in the spirit and scope of the invention and are also included in the scopes of inventions claimed and their equivalents.

What is claimed is:

1. A light source unit comprising:
   an excitation light source;
   a luminous light emitting plate which faces oppositely the excitation light source and which emits luminous light when light emitted from the excitation light source is emitted onto the luminous light emitting plate;
   a two-color light source device comprising:
      a first semiconductor light emitting element which emits a first light ray in a wavelength band which is different from a wavelength band of the luminous light emitted from the luminous light emitting plate;
      a second semiconductor light emitting element which emits a second light ray in a wavelength band which is different from the wavelength band of the luminous light emitted from the luminous light emitting plate and different from the wavelength band of the first light ray;
      a first collective lens which collects, within a predetermined range, the first light ray emitted from the first semiconductor light emitting element; and
      a second collective lens which collects, within a predetermined range, the second light ray emitted from the second semiconductor light emitting element, wherein the first semiconductor light emitting element and the second semiconductor light emitting element are disposed side by side;
   a dichroic mirror which is disposed in a position where an optical axis of a pencil of light emitted from the excitation light source and optical axes of the first light ray and the second light ray emitted from the two-color light source device intersect each other at right angles, wherein the dichroic mirror transmits the pencil of light emitted from the excitation light source, reflects the luminous light emitted from the luminous light emitting plate, and transmits the first and second light rays emitted from the two-color light source device; and
   a microlens array which irradiates, toward a same direction, the luminous light emitted from the luminous light emitting plate, which is reflected by the dichroic mirror, and the first and second light rays emitted from the two-color light source device, which are transmitted through the dichroic mirror, such that a luminance of the luminous light, the first light ray, and the second light ray is distributed uniformly within a predetermined range;
   wherein the first semiconductor light emitting element and the second semiconductor light emitting element are separately disposed at positions apart from each other with respect to a center line of the two-color light source device.

2. The light source unit according to claim 1, wherein a luminescent material provided on the luminous light emitting plate is a luminescent material which emits light in the green wavelength band, and
   wherein the first semiconductor light emitting element emits the first light ray in the blue wavelength band and the second semiconductor light emitting element emits the second light ray in the red wavelength band.

3. The light source unit according to claim 2, wherein the dichroic mirror transmits the first and second light rays in the blue and red wavelength bands and reflects the luminous light in the green wavelength band.

4. The light source unit according to claim 1, wherein the microlens array is disposed on optical paths of the first and second light rays emitted from the two-color light source device which pass through the dichroic mirror.

5. The light source unit according to claim 1, wherein each of the first and second semiconductor light emitting elements comprises a plurality of semiconductor elements.

6. The light source unit according to claim 1, wherein the excitation light source is a laser emitting device.

7. The light source unit according to claim 1, wherein the first and second semiconductor light emitting elements are laser emitting devices.

8. The light source unit according to claim 1, wherein the first and second semiconductor light emitting elements are light emitting diodes.

9. A projector comprising:
   the light source unit according to claim 1;
   a display element which produces projection light;
   an optical system which guides light emitted from the light source unit to the display element;
   a projection optical system which guides a projection light produced by the display element; and
   a projector control unit which controls the display element and the light source unit.

* * * * *